United States Patent
Landry

(10) Patent No.: US 9,262,418 B2
(45) Date of Patent: Feb. 16, 2016

(54) METHOD AND SYSTEM FOR PERFORMING SYSTEM MAINTENANCE IN A COMPUTING DEVICE

(75) Inventor: John A. Landry, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 453 days.

(21) Appl. No.: 13/825,591

(22) PCT Filed: Sep. 22, 2010

(86) PCT No.: PCT/US2010/049865
§ 371 (c)(1),
(2), (4) Date: Mar. 22, 2013

(87) PCT Pub. No.: WO2012/039711
PCT Pub. Date: Mar. 29, 2012

(65) Prior Publication Data
US 2013/0185299 A1    Jul. 18, 2013

(51) Int. Cl.
*G06F 9/00* (2006.01)
*G06F 9/24* (2006.01)
*G06F 15/177* (2006.01)
*G06F 17/30* (2006.01)
*G06F 9/44* (2006.01)

(52) U.S. Cl.
CPC ........ *G06F 17/30011* (2013.01); *G06F 9/4401* (2013.01)

(58) Field of Classification Search
CPC ... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | |
|---|---|---|---|
| 6,272,629 B1* | 8/2001 | Stewart | 713/2 |
| 6,457,134 B1* | 9/2002 | Lemke et al. | 713/323 |
| 2003/0074549 A1* | 4/2003 | Paul et al. | 713/2 |
| 2003/0229774 A1* | 12/2003 | Freeman et al. | 713/1 |
| 2005/0027976 A1 | 2/2005 | Stephan et al. | |
| 2005/0102568 A1 | 5/2005 | Billick et al. | |
| 2005/0283599 A1* | 12/2005 | Zimmerman et al. | 713/2 |

(Continued)

FOREIGN PATENT DOCUMENTS

CN    1648870    8/2005

OTHER PUBLICATIONS

"AMIDiag: Products and Strategy", < http://www.ami.com.tw/support/doc/Webpres.pdf > Publication Date: Apr. 8.

(Continued)

*Primary Examiner* — Zahid Choudhury
(74) *Attorney, Agent, or Firm* — International IP Law Group

(57) ABSTRACT

The present disclosure provides a computer-implemented method of performing system maintenance in a computing device. The method includes launching a maintenance application in a pre-operating system environment of a computing device (204). The maintenance application performs at least one hardware maintenance operation on the hardware of the computing device during device down time. The method also includes generating a log file based on the results of the at least one hardware maintenance operation (206). The method also includes terminating the maintenance application, launching the operating system of the computing device (208), and accessing the log file (210).

9 Claims, 3 Drawing Sheets

(56) References Cited

U.S. PATENT DOCUMENTS

| | | |
|---|---|---|
| 2006/0203578 A1 | 9/2006 | Meaney et al. |
| 2007/0157015 A1* | 7/2007 | Swanson et al. ............... 713/2 |
| 2007/0192654 A1 | 8/2007 | Lauterbach et al. |
| 2007/0245170 A1 | 10/2007 | Crowell et al. |
| 2008/0046546 A1 | 2/2008 | Parmar et al. |
| 2008/0148038 A1* | 6/2008 | Abe et al. ..................... 713/2 |
| 2008/0155332 A1* | 6/2008 | Landers et al. ............. 714/36 |
| 2009/0210689 A1 | 8/2009 | Harmer |
| 2009/0327679 A1 | 12/2009 | Huang et al. |
| 2011/0138219 A1* | 6/2011 | Walton et al. ................ 714/3 |
| 2011/0179224 A1* | 7/2011 | Rossi ......................... 711/114 |

OTHER PUBLICATIONS

"HP System Diagonsitcs (UEFI)" < http://h20000.www2.hp.com/bizsupport/TechSupport/SoftwareDescription.jsp?lang=en&cc=us&prodTypeId=321957&prodSeriesId=3688868&swItem=ob-80840-1&prodNameId=368870&swEnvOID=1093&swLang=8&taskId=135&mode=3> Publication Date: Feb. 16.

International Searching Authority, International Search Report and Written Opinion, Appln No. PCT/US2010/049865, date of mailing May 30, 2011, 9 p.

* cited by examiner

METHOD AND SYSTEM FOR PERFORMING SYSTEM MAINTENANCE IN A COMPUTING DEVICE

BACKGROUND

Computer systems such as personal computers (PCs) generally require periodic maintenance to assure top performance over the life of the computer system. However, in many cases, computer system maintenance and diagnosis is performed reactively when a problem arises, resulting in costly downtime for the user. Not performing periodic checks and maintenance on a computer system can result in performance or instability issues, user frustration and unnecessary support calls, which cost the user and the system provider time and money.

Furthermore, even if periodic computer system maintenance is performed, the maintenance programs available today generally execute within an operating system environment. Therefore, much of the hardware being checked is in use by the operating system and is therefore not fully available for testing. This can result in computer system problems being overlooked.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present techniques provide a system and method to proactively conduct system maintenance, optimization, and performance tests on a computing device such as a personal computer. The system maintenance, optimization and performance tests may be collectively referred to herein as "system maintenance" and may include, for example, a check and/or repair of the hard disk or other storage system, battery performance tests and calibration, cooling system tests, system board tests, and system memory tests, among others. The system maintenance may be executed during device downtime in an offline mode that does not interrupt the user's everyday usage of the PC. Further, the system maintenance may be executed in a pre-operating system boot environment, so that the operating system or applications running therein does not interfere with the various hardware tests and/or repairs performed during the system maintenance. In embodiments, the system maintenance may be executed by a system maintenance application that resides in a Unified Extensible Firmware Interface (UEFI) environment included in computer systems that have implemented UEFI BIOS.

Figure 1:
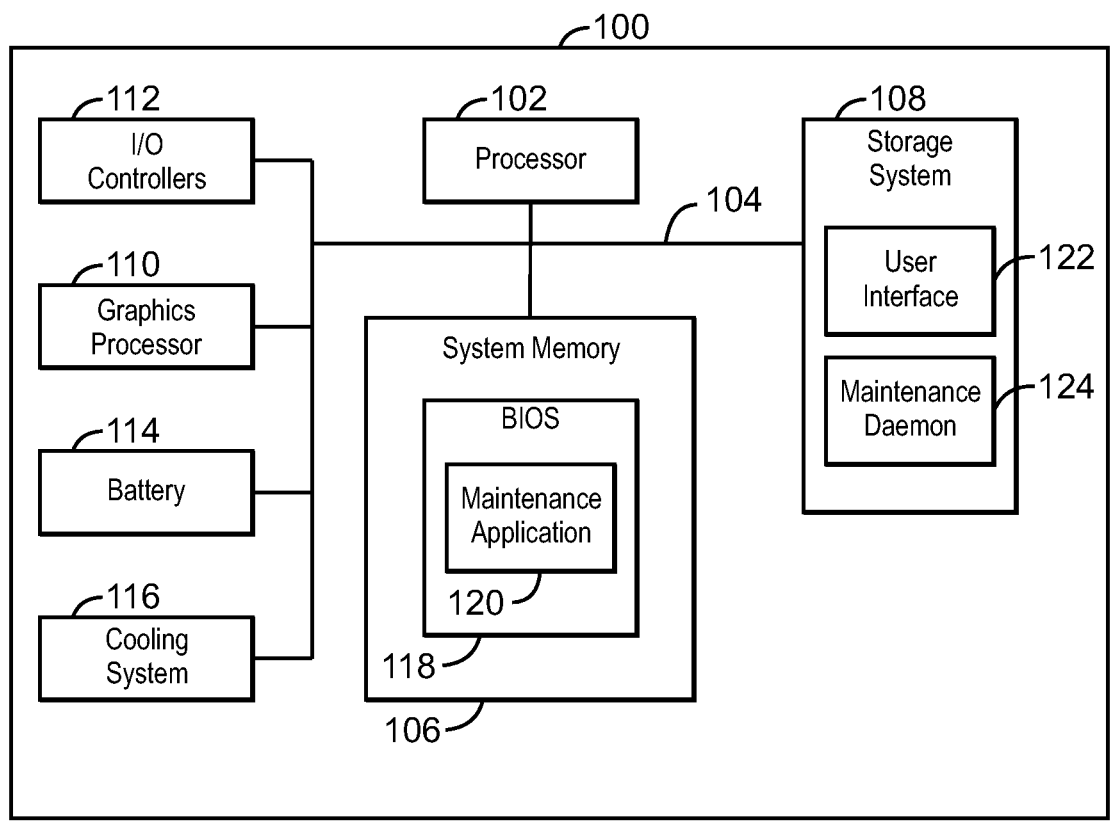
FIG. 1 is a block diagram of a computing device that includes a system maintenance application, in accordance with embodiments.

FIG. 1 is a block diagram of a computing device that includes a system maintenance application, in accordance with embodiments. The system is generally referred to by the reference number 100. Those of ordinary skill in the art will appreciate that the functional blocks and devices shown in FIG. 1 may comprise hardware elements including circuitry, software elements including computer code stored on a non-transitory, machine-readable medium, or a combination of both hardware and software elements. Further, the configuration is not limited to that shown in FIG. 1, as any number of functional blocks and devices may be used in embodiments of the present techniques. Those of ordinary skin in the art would readily be able to define specific functional blocks based on design considerations for a particular electronic device.

As illustrated in FIG. 1, the computing device 100 may include a processor 102 coupled through a bus 104 to one or more types of non-transitory, computer-readable media, such as a system memory 106 that may be used during the execution of various operating programs, including operating programs used in embodiments of the present techniques. The memory 106 may include read-only memory (ROM), random access memory (RAM), and the like. The computing device 100 can also include other non-transitory, computer-readable media, such as a storage system 108 for the long-term storage of operating programs and data, including the operating programs and data used in embodiments of the present techniques. The storage system 108 may include, for example, hard disks, optical drives, CDs, DVDs, flash memory, and the like. In embodiments, the storage system 106 may be a hard disk drive and may include disk maintenance firmware stored to a memory device of the hard disk drive. For example, the disk maintenance firmware may include error detection and correction programs, and may have the ability to automatically perform full surface scans, soft repair, and remapping of the hard disk.

The computing device 100 can also include one or more input devices not shown), such as a mouse, touch screen, and keyboard, among others. The computing device can also include a display (not shown), for example, a computer monitor, an LCD screen, and the like. In embodiments, the computing device 100 is a general-purpose computing device, for example, a desktop computer, laptop computer, business server, and the like.

The computing device 100 can also include a graphics processor 110 and one or more 110 controllers 112. in embodiments wherein the computing device 100 is a laptop or other battery operated electronic device, the computing device may also include a rechargeable battery 114. The battery 114 can include any suitable type of rechargeable batteries, such as lithium-ion (Li+), nickel cadmium (NiCd), nickel metal hydride (NiMH) batteries, and the like. The battery 114 may include or be operatively coupled to battery control circuitry, which may be programmed with battery control software or firmware for controlling the charge and discharge of the battery.

The computing device 100 can also include a cooling system 116. The cooling system may be configured to extract heat from various hardware components of the computing device 100, such as the processor 102, the graphics processor 110, the battery 114, and the like. The cooling system 116 may include one or more cooling ducts, heat sinks, heat pipes, fans, and other components designed to extract heat from the hardware components of the computing device 100. The cooling system 116 may also include one or more temperature sensors, which may be used by the processor to monitor the temperature of certain hardware components and heat flow through computing device 100. In embodiments, a baseline temperature profile may be generated for the computing device 100. The baseline temperature profile can include designed or measured temperature characteristics of the computing device 100 that serve as a baseline by which future temperature measurements may be compared in order to identify problems with the cooling system 116. The temperature profile may be generated by a manufacturer of the computing device and stored, for example, to the BIOS 118, or the storage system 108.

The computing device 100 can also includes a Basic input/output System (BIOS) 118. The BIOS 118 serves as an interface between system hardware/firmware and an operating system. In certain embodiments, BIOS 118 is a UEFI environment that may be integrated with or replace traditional basic input'output system (BIOS) firmware. Other suitable interfaces could be used in different embodiments. In various embodiments, BIOS 118 also serves as a boot loader, which performs the boot sequence and loading of the operating system for the computing device 100.

The computing device 100 can also include a maintenance application 120 for performing various system optimizations and performance tests, referred to herein as maintenance operations. The maintenance operations may include, for example, a check and/or repair of the hard disk or other storage system 108, battery performance tests and/or calibration, cooling system tests, system board tests, and system memory tests, among others. The maintenance operations performed by the maintenance application may be performed in a pre-operating system environment. In this way, fuller control over the computer system 100 hardware may be achieved without interference from other applications that would otherwise share hardware resources. Additionally, several system checks and optimizations may be performed in parallel to reduce the amount of time that the computer device 100 is unavailable to the user. The maintenance application 120 may be stored on any suitable non-transitory, computer-readable medium. For example, as shown in FIG. 1, the maintenance application 120 may be stored with the BIOS, which may on a dedicated BIOS memory chip included in the system memory 106. The maintenance application 120 may also be stored to the storage system 108 or a separate memory chip, such a ROM, EEPROM, Flash memory, and the like.

The computing device 100 can also include a user interface 122 that enables the user of the computing device 100 to control aspects of the maintenance application 120. For example, the user interface 122 can be used to schedule system maintenance, specify the types of maintenance tasks to be performed, specify various parameters of system maintenance activities, disable or enable the maintenance application, and the like. The user interface may also be used to display results of the various maintenance operations performed by the maintenance application 120.

The computer system may also include a maintenance daemon 124, which is a program that executes in the background and is configured to trigger a maintenance event. In embodiments, the maintenance event triggered by the maintenance daemon 124 causes the computing device 100 to terminate the operating system and launch the maintenance application 120 in the pre-operating system environment. The user interface 122 and maintenance daemon 124 may reside in and be accessible from the main operating system environment. As shown in FIG. 1, the user interface 122 and maintenance daemon 124 may be stored to storage system 108. Additionally, the user interface 122 and maintenance daemon 124 may be stored with the BIOS 118 on a separate memory chip, such a ROM, EEPROM, Flash memory, and the like. The techniques described herein may be better understood with reference to FIG. 2.

Figure 2:
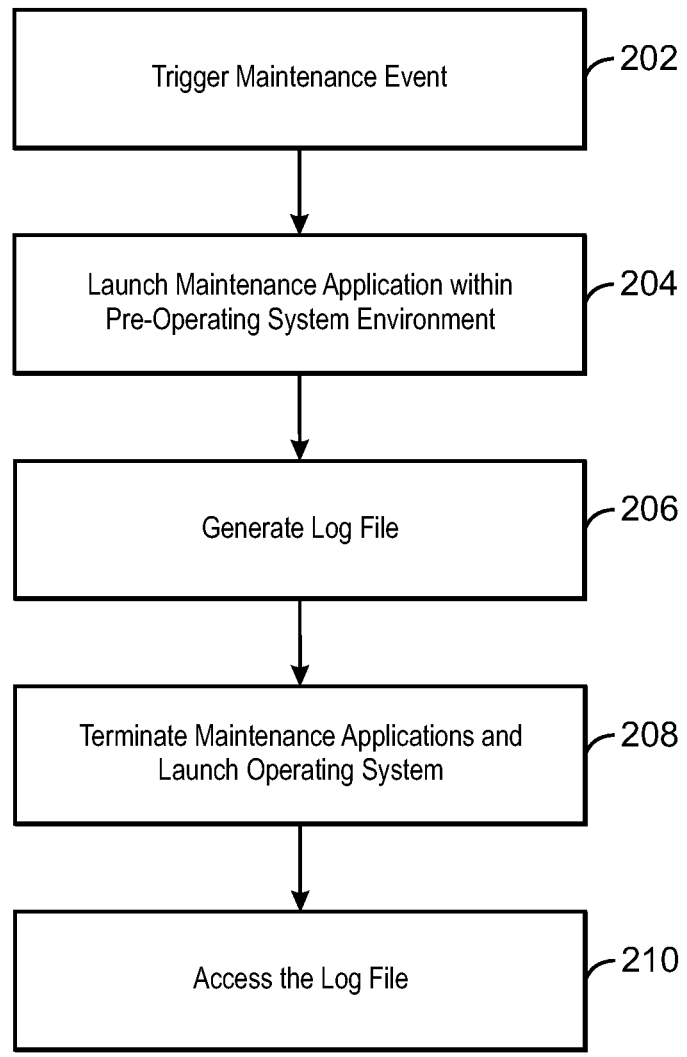
FIG. 2 is a process flow diagram of a method of performing system maintenance in a computing device, in accordance with embodiments.

FIG. 2 is a process flow diagram of a method of performing system maintenance in a computing device, in accordance with embodiments. The method may be referred to by the reference number 200. The method may begin at block 202, wherein a maintenance event is triggered. In embodiments, the maintenance event is triggered through an application operating in the operating system environment. In embodiments, the maintenance event can be triggered manually, for example, through the user interface 122. In embodiments, the maintenance event is automatically triggered by the maintenance daemon 124 according to a maintenance schedule which may be specified, for example, by the user or manufacturer of the computing device 100. In embodiments, the maintenance schedule can be specified so that the maintenance event is triggered during device down time, in other words, during times when the computing device is unlikely to be in use. The triggering of the maintenance event causes the computing device 100 to close the operating system, if running, and re-boot from the computing device's BIOS 118, A maintenance flag may be set in the BIOS 118 to indicate that the maintenance application 120 should be launched on the restart The maintenance flag may be reset by the maintenance application 120 when the system maintenance is complete.

In embodiments, the maintenance event is triggered from the operating system of the computing device 100, which may be operating in a standby state, such as a sleep mode or hibernation state. The triggering of the maintenance event may cause the computing device 100 to wake up from the standby state and trigger a restarting of the computing device's operating system. In embodiments, the maintenance event may be triggered while the computing device is in an off state. In such embodiments, the triggering of the maintenance event may cause the computing device 100 to turn on.

At block 204, the maintenance application 120 may be launched by the BIOS 118 within the pre-operating, system environment. When launched, the maintenance application 120 can perform a variety of computer maintenance tasks, including battery calibration, storage system check, cooling system check, system board integrity check, and memory check, among others. Further, two or more of the computer maintenance tasks may be performed simultaneously. By launching the maintenance application 120 before the operating system is loaded, the maintenance application 120 can operate in a single-threaded programming environment, wherein the maintenance application 120 can achieve more complete control over the computing device's hardware, without sharing resources with other applications that may otherwise be executing in the operation system environment. The computer maintenance tasks mentioned above are described further below.

In an embodiment, the maintenance application 120 can perform battery calibration for the battery 114. Due to the nature of various rechargeable batteries, it is commonly recommended that batteries be periodically calibrated to assure maximum battery life between charges. For example, battery calibration for lithium ion batteries commonly found in laptop computers should generally be performed every 60-90 days to assure maximum battery life between charges. Battery calibration generally uses some combination of charge and discharge cycles and may take 2-4 hours or longer to complete.

The maintenance application 120 can interface with battery's control logic to control charging and discharging of the battery 114. Because the maintenance application 120 performs the battery calibration in the pre operating system environment, the maintenance application avoids conflicts with a power management utility that may be built into the operating system of the computing device 100. Bypassing the power management utility allows the battery 114 to cycle from a fully charged state to a fully discharged state without interruptions caused by standby and/or hibernation states that may be enabled through the power management utility. Without bypassing such a power management utility, the operating system may not allow the battery to discharge fully. Additionally, the charging and discharging of the battery may be performed in conjunction with any of the additional maintenance features performed by the maintenance application 120. In embodiments, the electrical load placed on the battery during discharge results from the performance of one or more additional maintenance operations, such as the cooling check, the memory check, the system integrity check, the storage system check, and the like. Furthermore, each of the maintenance operations may be performed in such a way as to provide a constant electrical load to the battery 114.

In an embodiment, the maintenance application 120 can perform maintenance of the storage system 101 For example, the maintenance application 120 can perform a check of a hard disk using a full surface scan and soft repair of the hard disk. The full surface scan of the hard disk scan repair errors commonly referred to as "soft failures," wherein the correct data, is recoverable through the use of error detection and correction techniques. Upon the detection of a soft error, the hard disk can remap the sector in which an error is detected to a new sector. Because the maintenance application 120 operates outside of the pre-operating system environment, portions of the hard disk that would otherwise be in use by the operating system may be available for remapping, resulting in a more thorough maintenance operation. Depending on the size of the hard disk, a full surface scan could take one to several hours.

In an embodiment, maintenance application 120 can perform a check of the cooling system 116 to determine whether the cooling system 116 may be clogged or otherwise not functioning properly. A malfunctioning cooling system can impact performance of the computing device 100 by forcing throttling of the processor 102 and could cause further damage if not corrected. The maintenance application 120 may check the cooling system 116 through the use of a stress test. The stress test can drive certain heat-producing hardware components of the computing device, such as the processor 102 and the graphics processor 100. The temperature of the hardware components can be measured through the use of thermal sensors and used to generate a current thermal profile of the computing device 100. The current thermal profile can he compared against the original thermal profile measured, for example, when the computing device 100 was manufactured. In this way, the flow of heat through the computing device 100 can be evaluated against a known or designed thermal profile to identify abnormalities.

In an embodiment, the maintenance application 120 can perform a system integrity check. The system integrity check may be used to detect intermittent errors associated with the processor 102, graphics processor 110, system bus 104, I/O controllers 112, the systems circuit board, and the like. During the system integrity check the maintenance application can perform a set of computer operations that would utilize the core components of the computing device 100 such as the processor 102, system memory 106, bus controller, I/O controller 112, graphics processor 110, and the like, in a manner to stress the combination of subsystems to exercise the pins of the devices to detect any integrity issues with how they are secured to the system board or any timing related issues between the components. Any system errors detected during the system integrity checks would indicate a possible intermittent problem with the systems circuit board or other components of the computing device 100. The system integrity checks may be iteratively repeated to identify intermittent errors. Furthermore, the system integrity checks may be performed during, the check of the cooling system, battery calibration, hard disk check, and other maintenance operations. In embodiments, the system integrity checks provide some portion of the processing load that drives the hardware components during the check of the cooling system 116 and discharges the battery 114 during the battery calibration.

In an embodiment, the maintenance application 120 can perform a check of the system memory 106. The system memory 106 can be a common failure point in any computing device 100. Proactively diagnosing system memory issues can help to prevent system crashes and instability. The check of the system memory 106 can be performed by toggling individual memory bits of the system memory 106 and analyzing the system memory response for timing issues. In the operating system environment, portions of the memory system would generally be reserved by certain programs executing in the operating system environment and would thus be inaccessible for error testing operations. Because the maintenance application 120 performs the check of the system memory 106 in the pre-operation system environment, the maintenance application 120 can exercise full control over the system memory 106 without interference from the programs that would otherwise be executing in the operating system environment. The check of the system memory 106 may take several hours to complete. In embodiments, the maintenance application 120 performs the check of the system memory 106 in parallel with other maintenance operations, for example, battery calibration, system integrity checks, storage system maintenance, cooling system check, and the like.

At block 206, the maintenance application may generate a log file detailing the results of the various maintenance operations performed by the maintenance application. Although shown as a separate block, it will be appreciated that the log file may be generated in conjunction with the maintenance operations of the maintenance application 120, for example, as reportable events occur. The log file may be stored to the storage system 108 or any other memory location accessible from the operating system of the computing device 100.

The log file can include any reportable condition identified during the maintenance operations performed by the maintenance application 120, including the success or failure of certain operations, as well as any possibly problematic conditions identified. For example, the log file can include one or more envies regarding the completion of the battery calibration as well as entries or indicators regarding the state of the battery 114, such as the charge capacity of the battery, and the like. The log file entries regarding the battery 114 may be used to determine whether the battery 114 is operating properly or is in need of replacement The log file may also include one or more entries regarding the state of the system memory 106, for example, an indication that the system memory 106 is fully operational, or indications regarding memory bits that appear to be faulty. The log file may also include entries regarding the errors detected during the check of the storage system 108 and whether the errors were successfully repaired. The log file may also include entries regarding the detection of intermittent or persistent errors encountered during the system integrity checks.

The log file may also include entries regarding the condition of the cooling system, such as the presence of abnormalities in the cooling system and/or an indication of the source of the abnormality. For example, a log entry may indicate that a particular component of the computing system 100 may be overheating. In embodiments, the current thermal profile of the computing device 100 may be stored to the log file.

At block 208, the maintenance application 120 terminates and returns control of the computing device 100 to the legacy BIOS or the UEFI, depending on the particular embodiment. The legacy BIOS or UEFI may then complete any remaining BIOS tasks and launch the operating system of the computing device 100. Upon the loading of the operating system, the operating system may in turn launch certain start-up applications or background executables, such as the user interface 122, maintenance daemon, or other maintenance utility configured to obtain and/or interpret the maintenance results contained in the log file.

At block 210, the log file generated by the maintenance application may be accessed from within the operating system of the computing device 100. In embodiments, the log file can be opened manually, for example, by the user, an administrator, or a service technician. The log file may be used to assist in validating the stability of the system without performing additional, lengthy diagnostics.

In embodiments, an application running in the operating system environment, such as the user interface 122, maintenance daemon 124, or other maintenance utility, may access the log file automatically and alert the user regarding reportable conditions. For example, the maintenance utility may alert the user regarding a possible cooling system fault, such as a blocked cooling duct, or clogged heat sink. The maintenance utility may also warn the user of a problem with system memory 106 such as failed memory bits. The maintenance utility may inform the user regarding the soft errors detected on the bard disk or storage system 108 and the success or failure of repairing the soft errors or remapping the data. The maintenance utility may also alert the user regarding the existence of an intermittent error encountered during the system integrity checks. The maintenance utility may also inform the user regarding the completion of the battery calibration. In this way, the results log file can be used to proactively notify the user of system integrity issues and to provide overall status of the stability of the system. Proactive notification can enable the user to take proactive steps to correct potential problems with the computing device 100 before they cause substantial inconvenience to the user.

Figure 3:
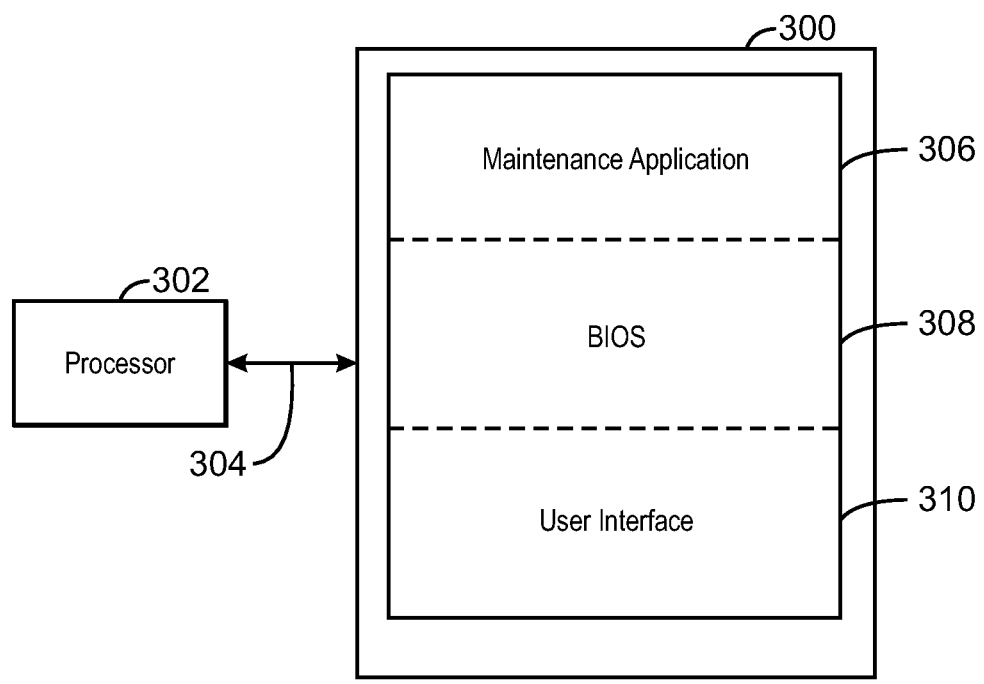
FIG. 3 is a block diagram showing a non-transitory, computer-readable medium that stores code configured to perform system maintenance in a computing device, in accordance with embodiments.

FIG. 3 is a block diagram showing a non-transitory, computer-readable medium that stores code configured to perform system maintenance in a computing device, in accordance with embodiments. The non-transitory, machine-readable medium is referred to by the reference number 300. The non-transitory, computer-readable medium 300 can comprise any suitable storage device that stores computer-implemented instructions such as programming code. For example, the non-transitory, computer-readable medium 300 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. In an embodiment, the non-transitory, computer-readable medium 300 includes a computer chip in which the BIOS 116 is implemented. In an embodiment, the non-transitory, computer-readable medium 300 includes a storage device that contains a software or firmware update that can be used to update all or a portion of the BIOS 118. The non-transitory, computer-readable medium 300 may be accessed by a processor 302 over a communication path 304.

As shown in FIG. 3, the various exemplary components discussed herein can be stored on the non-transitory, computer-readable medium 300. A first region 306 on the non-transitory, computer-readable medium 300 can include a maintenance application that performs one or more hardware maintenance operations on the hardware of the computing device during device down time, as discussed with respect to FIG. 2. The maintenance application is configured to be launched in a pre-operating system environment of a computing device, for example, by the system BIOS. The maintenance application can also generate a log file based on the results of the one or more hardware maintenance operations. A region 308 can include a BIOS, such as a UEFI based BIOS, configured to receive control of the pre-operating system environment and launch the operating system of the computing device. A region 310 can include a user interface configured to access the log file. The user interface can operate within the operating system environment. Although shown as contiguous blocks, the software components can be stored in any order or configuration. For example, if the non-transitory, computer-readable medium 300 is a hard drive, the software components can be stored in non-contiguous, or even overlapping, sectors.

What is claimed is:

1. A method, comprising:
launching a maintenance application in a pre-operating system environment of a computing device, wherein the maintenance application performs at least one hardware maintenance operation on the hardware of the computing device during device down time, wherein the at least one hardware maintenance operation comprises a battery calibration and at least one additional hardware maintenance operation, wherein the at least one additional hardware maintenance operation operates in parallel to the battery calibration and provides an electrical load for discharging the battery;
generating a log file based on the results of the at least one hardware maintenance operation;
terminating the maintenance application and launching the operating system of the computing device; and
accessing the log file.

2. The method of claim 1, comprising triggering a maintenance event from the operating system of the computing device according to a specified maintenance schedule while the computing device is in a standby state, and initiating a restart of the operating system of the computing device.

3. The method of claim 1, wherein the at least one additional hardware maintenance operation comprises a system memory check, a hard disk surface scan, a cooling system check, a system integrity check, or combinations thereof.

4. A computer system, comprising:
a processor that is configured to execute machine-readable instructions;
a memory device that stores instruction modules that are executable by the processor, the instruction modules comprising:
a maintenance application configured to perform at least one hardware maintenance operation on the hardware of the computer system in a pre-operating system environment during device down time and generating a log file based on the results of the at least one hardware maintenance operation, wherein the at least one hardware maintenance operation comprises a cooling system check and at least one additional hardware maintenance operation, wherein the at least one additional hardware maintenance operation operates in parallel to the cooling system check and provides the processing load used to generate heat within the computer system;

a basic input/output system (BIOS) configured to receive control of the pre-operating system environment and launch the operating system of the computer system; and a user interface configured to access the log file.

5. The computer system of claim 4, wherein the instruction modules comprise a maintenance scheduling utility configured to trigger a maintenance event from the operating system of the computer system according to a specified maintenance schedule white the computer system is in a standby state and initiate a restart of the operating system of the computer system.

6. The computer system of claim 4, wherein the at least one additional hardware maintenance operation comprises a system memory check, a hard disk surface scan, a battery calibration, a system integrity check, or combinations thereof.

7. A non-transitory, computer readable medium, comprising instruction modules configured to direct a processor to:

perform at least one hardware maintenance operation on hardware of a computing device in a pre-operating system environment during device down time, wherein the at least one hardware maintenance operation comprises a battery calibration and at least one additional hardware maintenance operation, wherein the at least one additional hardware maintenance operation operates in parallel to the batter calibration and provides an electrical load for discharging the battery;

generate a log file based on the results of the at least one hardware maintenance operation;

launch the operating system of the computing device; and access the log file.

8. The non-transitory, computer readable medium of claim 7, comprising instruction modules configured to direct the processor to trigger a maintenance event from the operating system of the computing device according to a specified maintenance schedule while the computing device is in a standby state and initiate a restart of the operating system of the computing device.

9. The non-transitory, computer readable medium of claim 7, wherein the at least one additional hardware maintenance operation comprises a system memory check, a hard disk surface scan, a cooling system check, a system integrity check, or combinations thereof.

* * * * *

UNITED STATES PATENT AND TRADEMARK OFFICE
CERTIFICATE OF CORRECTION

PATENT NO. : 9,262,418 B2
APPLICATION NO. : 13/825591
DATED : February 16, 2016
INVENTOR(S) : John A. Landry It is certified that error appears in the above-identified patent and that said Letters Patent is hereby corrected as shown below:

In the Claims

In column 9, line 14 approx., in Claim 5, delete "white" and insert -- while --, therefor.

In column 10, line 6, in Claim 7, delete "batter" and insert -- battery --, therefor.

Signed and Sealed this
Fourteenth Day of June, 2016

Michelle K. Lee
*Director of the United States Patent and Trademark Office*